Feb. 27, 1973   E. PESCHL ET AL   3,718,011
METHOD OF PRODUCING A WARP KNITTED OR SEWN FABRIC
Filed April 17, 1970   6 Sheets-Sheet 3

Feb. 27, 1973  E. PESCHL ET AL  3,718,011
METHOD OF PRODUCING A WARP KNITTED OR SEWN FABRIC
Filed April 17, 1970  6 Sheets-Sheet 6

United States Patent Office 3,718,011
Patented Feb. 27, 1973

3,718,011
METHOD OF PRODUCING A WARP KNITTED
OR SEWN FABRIC
Ervin Peschl, Ceska u Brna, and Jan Skrepek, Olsany, Czechoslovakia, assignors to W. Schlafhorst & Co., Monchengladbach, Germany, and Vyzkumny Ustav Pletarsky, Brno, Czechoslovakia, fractional part interest to each
Filed Apr. 17, 1970, Ser. No. 29,522
Claims priority, application Czechoslovakia, Apr. 17, 1969, 2,747
Int. Cl. D04b 23/08
U.S. Cl. 66—192        11 Claims

ABSTRACT OF THE DISCLOSURE

Method of producing a warp knitted or stitch-bonded fabric with knitting needles having a hook portion and a portion movable for closing the hook and at least two guide bars, includes the steps of laying-in a first thread in the needle hook portion with one of the guide bars, downwardly displacing the needle with the hook thereof remaining open, upwardly displacing the needle so that the first thread slides down onto the shank of the needle, laying-in a second thread in the needle hook portion with another of the guide bars, downwardly displacing the needle with the hook thereof closed by the movable hook-closing portion thereof so that the first thread, forming a tuck lap, slides from the shank and off the closed hook portion of the needle together with a stitch of a previously knitted course while the second thread in the next-succeeding course forms a stitch of a ground web structure, and during the foregoing steps, inserting unstitched standing threads in longitudinal direction in the ground web structure by means of an additional guide bar.

Our invention relates to method of producing a warp knitted fabric or stitch-bonded fabric by employing bipartite knitting needles having a hook portion and a portion movable for closing the hook and at least two guide bars.

Warp knitted fabrics are known that are formed from a ground web structure in chain-stitch pattern with wales connected by underlaps and further of nonstitched standing threads interlaced with the underlaps. Such warp knitted fabrics have a woven-like appearance but, nevertheless, do not attain the other characteristics of a woven fabric, especially adequate resistance to shifting of the loops formed therein.

It is an object of our invention to provide method of producing a warp knitted or stitch-bonded fabric to enrich presently available limited design patterns with the production of such warp knitted fabrics and also to improve the woven-like characteristics of the fabrics.

With the foregoing and other objects in view, we provide, in accordance with the invention, method of producing a warp knitted or stitch-bonded fabric with knitting needles having a hook portion and a portion movable for closing the hook and at least two guide bars, which comprises the steps of laying-in a first thread in the needle hook portion with one of the guide bars, downwardly displacing the needle with the hook thereof remaining open, upwardly displacing the needle so that the first thread slides down onto the shank of the needle, laying-in a second thread in the needle hook portion with another of the guide bars, downwardly displacing the needle with the hook thereof closed by the movable hook-closing portion thereof so that the first thread, forming a tuck lap, slides from the shank and off the closed hook portion of the needle together with a stitch of a previously knitted course while the second thread in the next-succeeding course forms a stitch of a ground web structure, and during the foregoing steps, inserting unstitched standing threads in longitudinal direction in the ground web structure by means of an additional guide bar.

In accordance with a further feature of the invention, when forming other courses, we place the threads below at least one needle by means of the guide bar which produces the tuck laps so that these threads form underlaps.

Alternatively, in accordance with the invention, when forming other courses we place the threads in the needle hooks by means of the guide bars producing the tuck laps, the hooks being closed during the downward displacement of the needles, into the casting off or knocking over position, so that stitches of the ground web structure are formed.

In accordance with a further feature of the invention, we form loops in every second course, or stitches of a pattern in every course by means of yet another guide bar from a further warp system, with the aid of knitting needles of a second needle bar. We sever the plush loops formed thereby to produce a velvety surface of the fabric.

In accordance with other features of the invention and in order further to increase the number of possible design patterns, we form on a needle bar, by means of a guide bar cooperating with the knitting needles, tuck laps in specific courses and, in other courses, either underlaps or stitches of the ground web structure from threads of a warp system drawn into this guide bar in accordance with a pattern, whereas we form with a second guide bar from the threads of a further warp system drawn-in pattern-wise on the needles of the same needle bar which do not form stitches, loops in several courses and underlaps in the remaining courses. Alternatively, in accordance with the invention, we provide two guide bars which, in fact, have the same drawn-in pattern which is, however, offset from one another, so that we fill the thread of one warp system always between threads of the other warp system and, in cooperation with the knitting needles, we form in specific rows tuck laps and in other rows either underlaps or stitches of the ground web structure, the guide bars placing in selected courses the thread in the hooks of pairs of adjacent knitting needles and the pattern of both warp systems in these courses lying either in the same or opposite directions with respect to one another.

In accordance with yet another feature of the invention and in order to reduce the stretchability and increase the durability of the fabric, we dispose each nonstitched standing thread alternatively over and under at least one thread of the ground web structure or over and under an underlap.

Other features which are considered as characteristic for the invention are set forth in the appended claims.

Although the invention is illustrated and described herein as method of producing a warp knitted or stitch-bonded fabric, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings in which.

Figure 1:
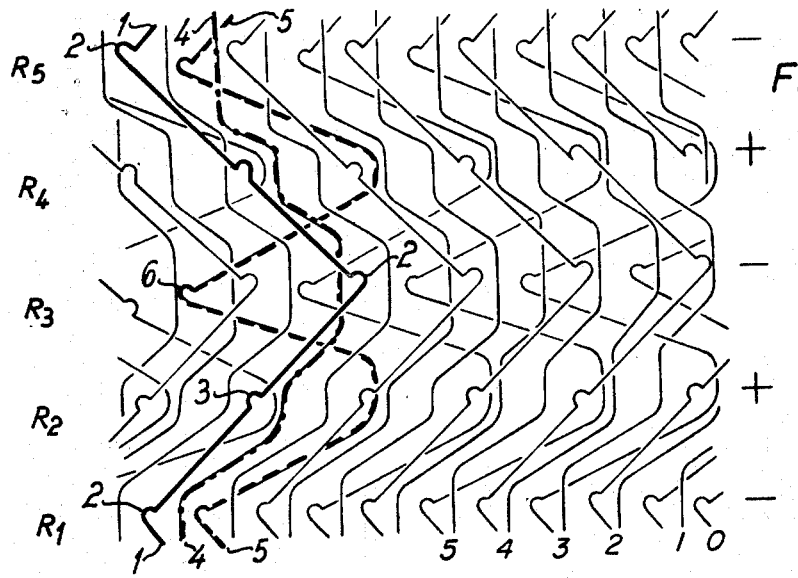
FIG. 1 is a schematic view of a pattern of a three-guide bar, single-needle bar knitted fabric.
Figure 2:
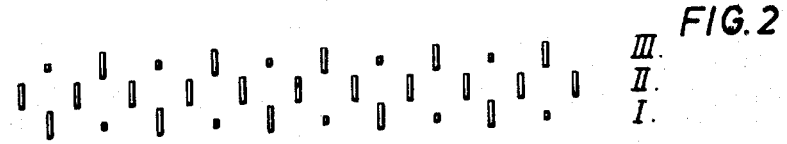
FIG. 2 is a diagrammatic view of the thread filling of the guide bars to produce the pattern of FIG. 1.
Figure 3:
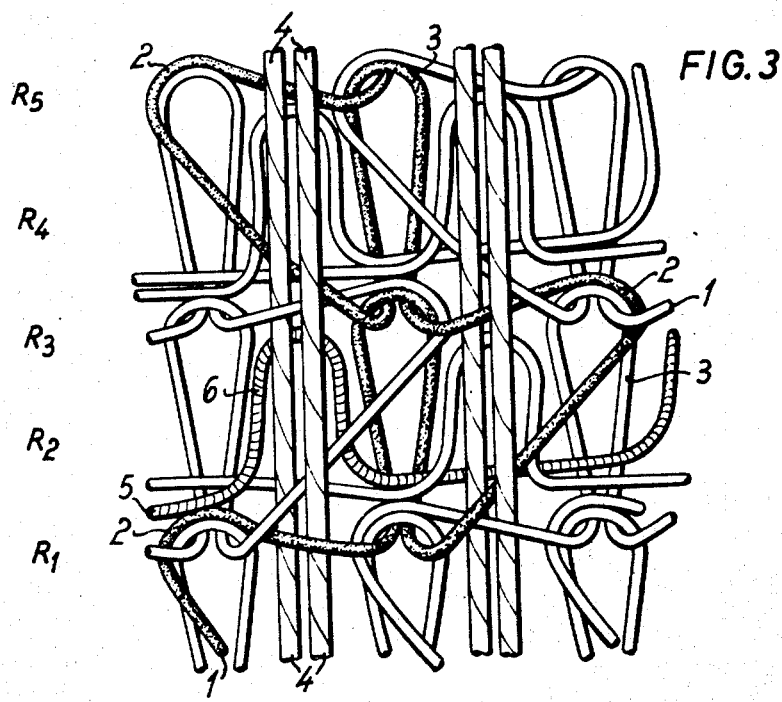
FIG. 3 is a plan view of the interlacing structure produced by the pattern and thread filling according to FIGS 1 and 2.

Referring now to the drawings and first particularly to FIGS. 1–3 thereof, there is shown in FIG. 2, for a first guide bar I pattern-threaded one in, one out, i.e. one eye needle filled and one empty, the guide bar I forming from a warp 1 (FIGS. 1 and 3) an atlas pattern which has tuck laps 2 in the reverse courses $R_1$, $R_3$ and $R_5$, whereas in the reverse courses $R_2$ and $R_4$, threads for forming stitches of the ground web structure of the fabric are inserted. To improve the differentiation between the threads, the warp thread 1 of the thread chain is shown in FIG. 3 in darker lines and, also, in FIG. 1 the pattern is shown by a darker line. In every second course, the guide bar I inserts the thread 1 into the hook of a latch or eye needle, compound needle, tubular needle or grooved needle, for example, which remains open as it is displaced downwardly into the knocking-over or cast-off position so that the thread 1 is slid onto the shaft or stem of the knitting needle as it is thereafter displaced upwardly. Following a subsequent lateral displacement of the guide bar I*, a second warp thread 1' of the same thread chain is inserted in the hook of the same knitting needle in the upper position thereof.

Due to the subsequent downward displacement of the knitting needle into its knocking-over or cast-off position, this time with the hook thereof closed off by the movable portion of the needle, the first warp thread 1 slides simultaneously with the stitch or loop 3* of the previous course over the closed head of the needle and forms a tuck lap 2 whereas the warp thread 1' in the subsequent course again forms a stitch or loop of the ground web structure. The courses wherein the knitting needles are displaced, with closed hooks upwardly into the knocking-over position, i.e. wherein they form stitches or loops, are indicated in FIG. 1 and also in FIGS. 4, 7, 10 and 13 by a plus sign (+), whereas the courses wherein the knitting needles are displaced downwardly with open hooks, i.e. forming no loops or stitches, are indicated by a minus sign (−).

The second guide bar II (FIG. 2) has a full thread filling and places nonstitched standing threads 4 (FIG. 3) in the longitudinal direction of the fabric, the patterns thereof being shown in FIG. 1 by a dot-dash line. Each nonstitched standing thread 4 extends in longitudinal direction alternately over and under at least one warp thread 1 of the ground web structure.

A third guide bar III (FIG. 2) is pattern-threaded one in, one out and places in each reverse course $R_1$, $R_3$ and $R_5$, warp threads 5 in the hooks of knitting needles which do not form stitches, and forms loops 6. On the other hand, the guide bar III, in the reverse courses $R_2$ and $R_4$ passes underlaps under two needles. For the purpose of better distinguishing the threads, a thread 5 of the thread chain in FIG. 3 is shown in heavy shading, and the pattern thereof in FIG. 1 is represented by a dotted line.

Figure 5:
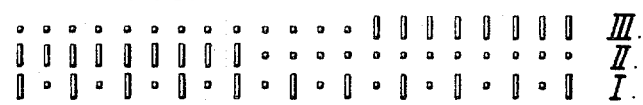
FIG. 5 is a schematic view of the thread filling of the guide bars to produce the pattern of FIG. 4.
Figure 6:
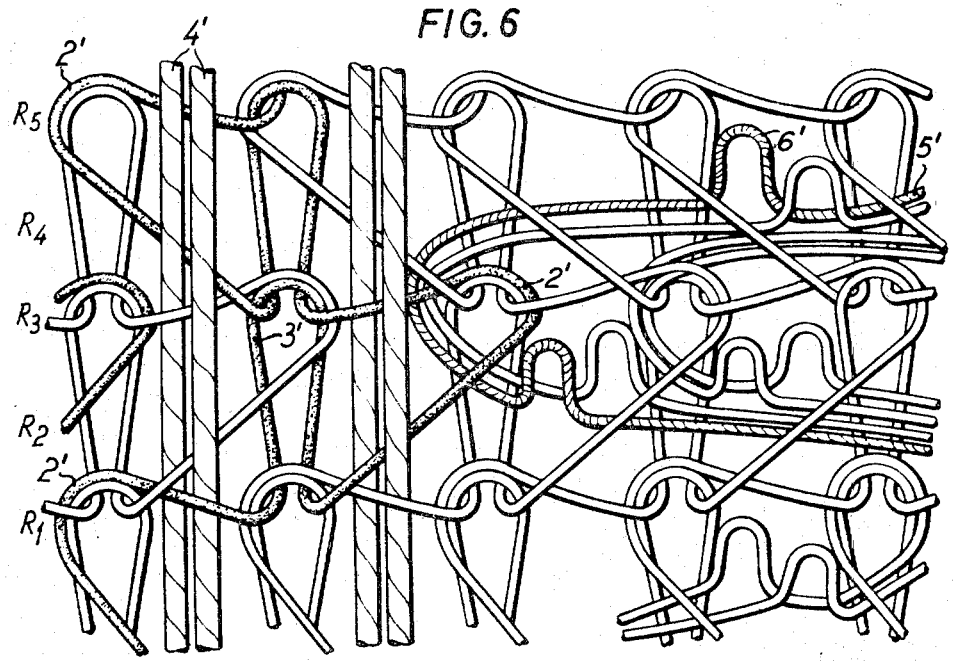
FIG. 6 is a plan view of the interlacing structure produced by the pattern and thread filling according to FIGS. 4 and 5.

In the production of the interlacing structure shown in FIG. 6, the first guide bar I has the same thread filling (FIG. 5) as in the preceding example of FIG. 2 and operates also in a similar manner, so that it forms an atlas pattern with the warp thread 1' on the forward needle bar in the course of which the tuck laps 2' in the reverse courses $R_1$, $R_3$ and $R_5$ alternate with the stitches or loops 3' of the ground web structure in the reverse courses $R_2$ and $R_4$. The representation of a warp thread 1' in FIG. 6 and the pattern thereof in FIG. 4, with darker lines, is effected in the same manner as in FIGS. 1 and 3, respectively. The second and third guide bars have pattern thread fillings. The second guide bar II places longitudinally standing threads 4' having a pattern which is the same as in the foregoing example (the dot-dash line in FIG. 4).

Figure 4:
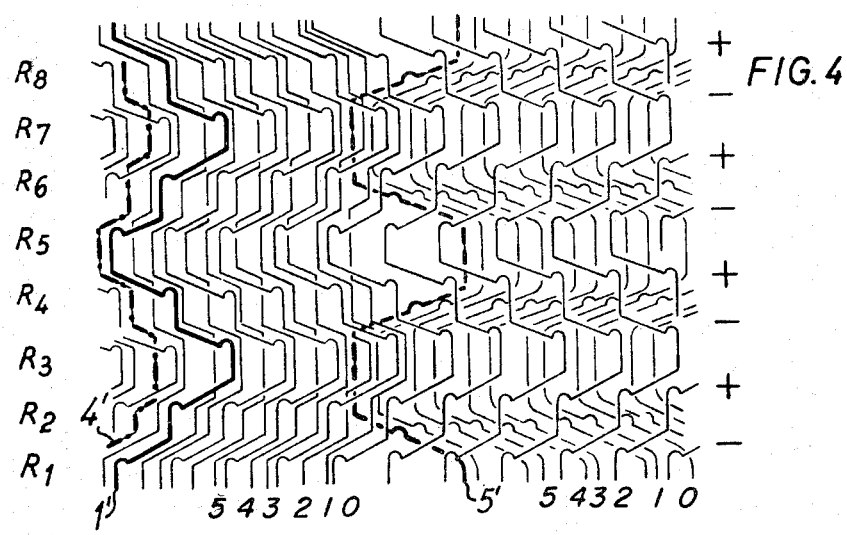
FIG. 4 is a schematic view of the pattern of a three guide bar, two-needle bar knitted fabric.

The third guide bar III places threads in the knitting needles of the rear needle bar where they form loops 6' whereas on the forward needle bar they pass underlaps alternately under one and under two needles. To obtain a better distinction among the threads, a warp thread 5' of this thread chain in FIG. 6 is shown with heavy shading and the pattern thereof in FIG. 4 is represented by a dotted line.

Figure 7:
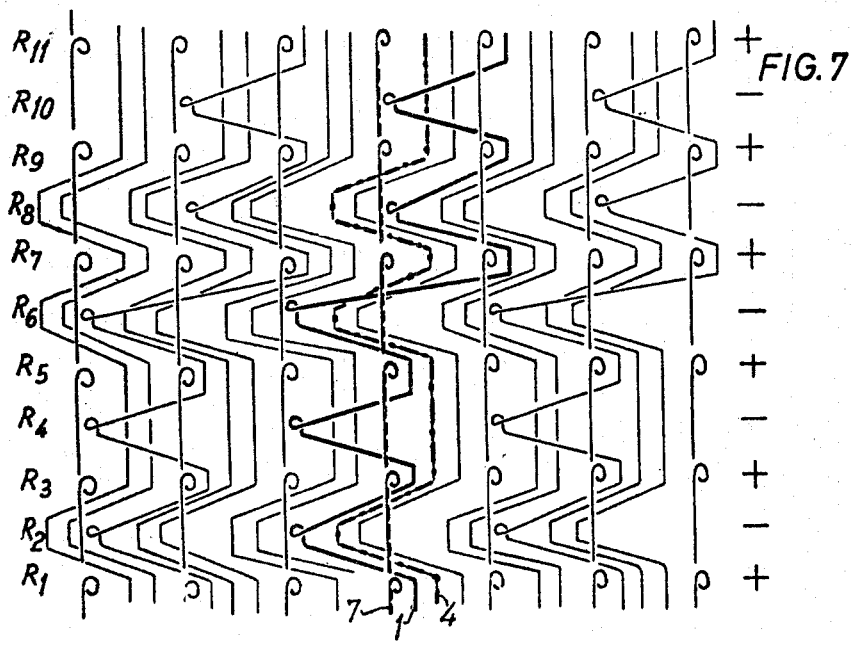
FIG. 7 is a schematic view of a pattern of a three-guide bar, single-needle bar knitted fabric combined with underlaps under two and four needles.
Figure 8:
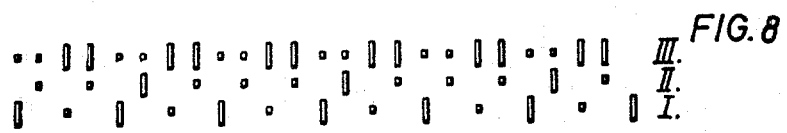
FIG. 8 is a schematic view of the thread filling of the guide bars to produce the pattern of FIG. 7.
Figure 9:
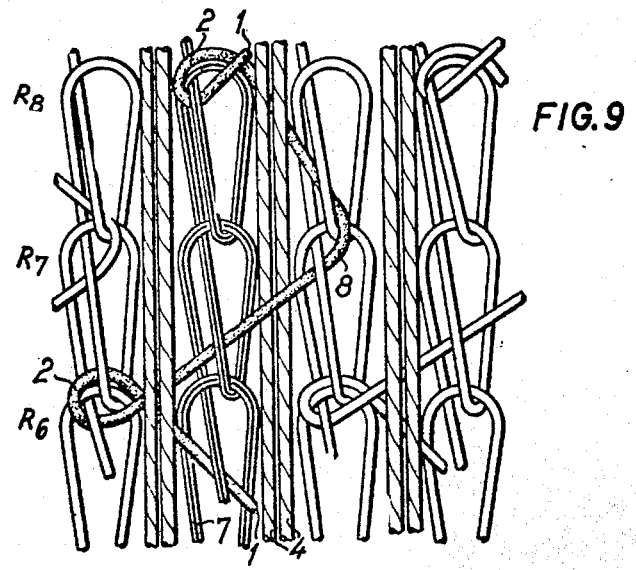
FIG. 9 is a plan view of the interlacing structure produced by the pattern and thread filling according to FIGS. 7 and 8.

The interlacing structure shown in FIG. 9 is formed in each second course, of a fringed pattern produced by the first guide bar I (FIG. 8) pattern-stitched one in, one out. Such a fringe 7" is shown in FIG. 9 by a triple line and the pattern thereof is represented in FIG. 7 by a dotted line. The second guide bar II is threaded with warp threads 1" one in, three out, i.e. one eye needle filled and three empty, and forms in each odd-numbered reverse course underlaps 8" under two and under four needles which alternate with tuck laps 2" in each even-numbered reverse course. Simultaneously, the wales of the chain-stitch pattern 7" are connected to one another by this lapping to obtain a better differentiation between the threads. The warp thread 1" in FIG. 9 is shown with a heavy line and the pattern thereof in FIG. 7 is similarly shown with a heavy line.

The third guide bar III pattern threaded two in, two out places unstitched or unlooped standing threads 4" in longitudinal direction of the fabric, the standing threads 4" being shown in FIG. 7 by a dotted line.

Figure 10:
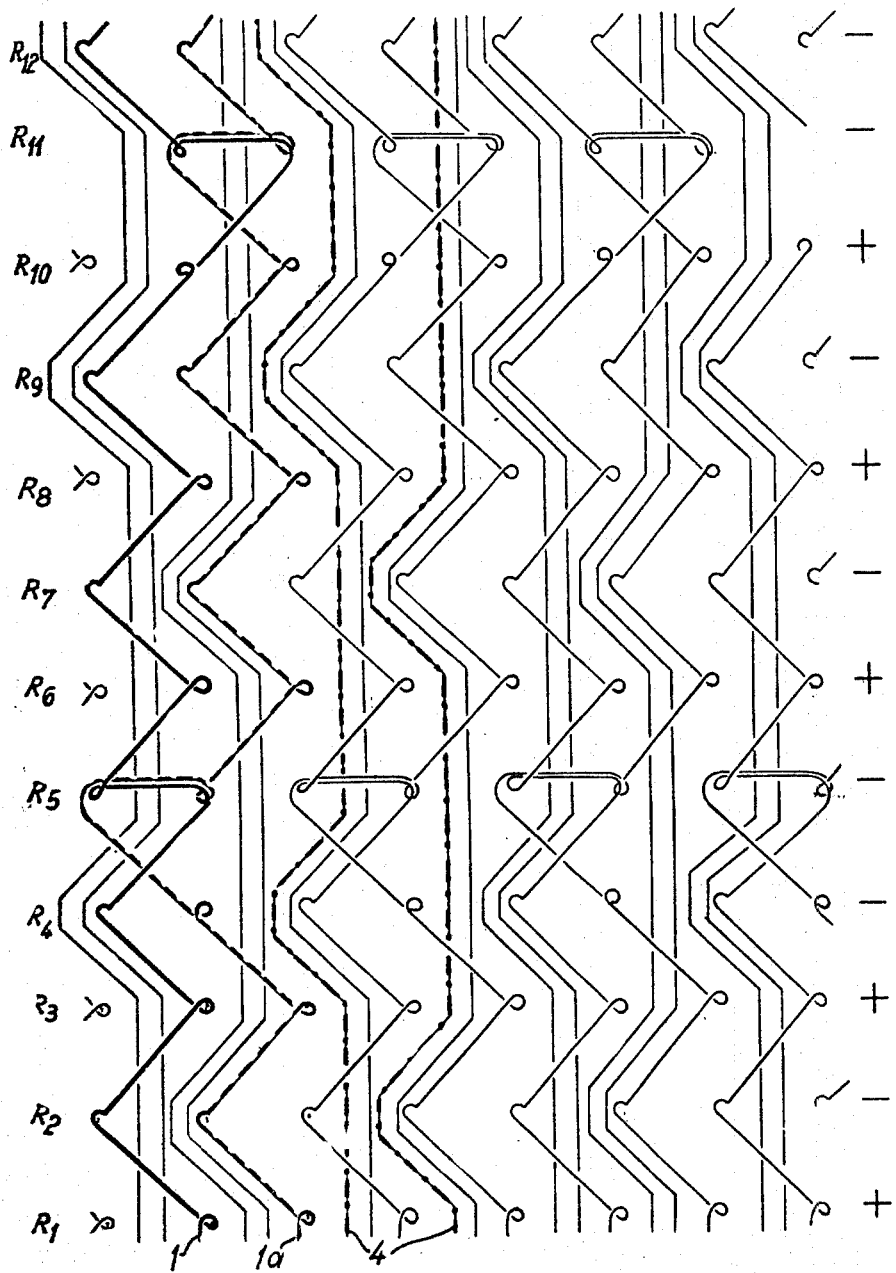
FIG. 10 is a schematic view of the pattern of a four-guide bar, single-needle bar knitted fabric.
Figure 11:
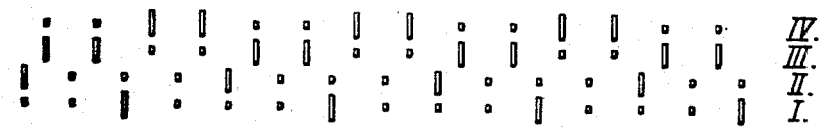
FIG. 11 is a diagrammatic view of the thread filling of the guide bars to produce the pattern of FIG. 10.
Figure 12:
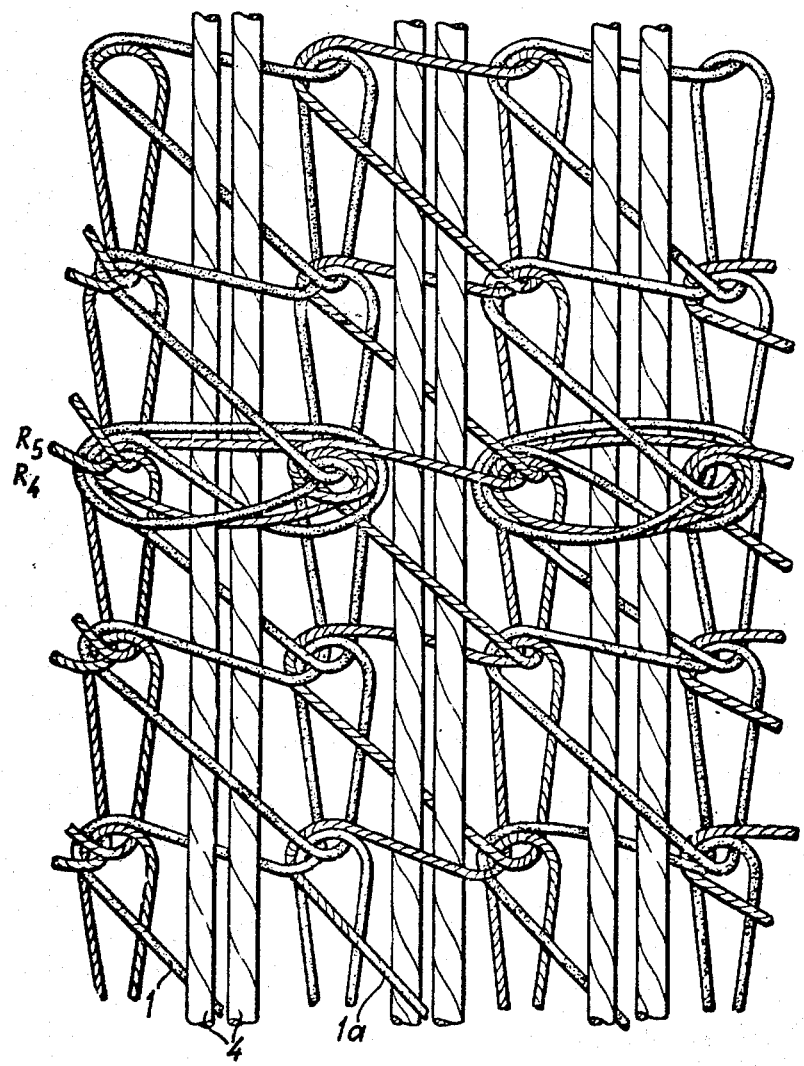
FIG. 12 is a plan view of an interlacing structure produced by the pattern and thread filling according to FIGS. 10 and 11.

To produce an interlaced structure as shown in FIG. 12, two guide bars I and II (FIG. 11) are threaded in the same ratio of the filled to the empty eye needles, i.e. both are pattern-threaded one in, three out, the filling of both guide bars being however offset with respect to one another, so that a warp thread 10''' of the one thread chain always places between the warp threads 1'''a a second thread chain. Both guide bars I and II form a cloth pattern wherein stitches 3''' of the ground web structure in the courses $R_1$, $R_3$, $R_6$, $R_8$ and $R_{10}$ alternate with tuck laps 2''' in the courses $R_2$, $R_4$, $R_7$, $R_9$ and $R_{12}$. In several selected courses $R_5$ and $R_{11}$, both of these guide bars I and II place threads disposed in opposite directions in the hooks of adjacent knitting needles. For the purpose of better distinguishing the threads, the threads 1''' of the one thread chain in FIG. 12 are represented by a darker line and the threads 1'''a of the second thread chain are shown with heavy shading. The pattern of these threads is shown in FIG. 10 respectively by a darker line and a dotted line.

The third and fourth guide bars III and IV are pattern-threaded two in, two out and insert unstitched standing threads 4''' in the longitudinal direction of the fabric.

In this manner, a one-needle bar interlacing structure combined with a plastic press pattern is obtained in the courses $R_4$, $R_5$ and $R_{10}$, $R_{11}$.

Figure 13:
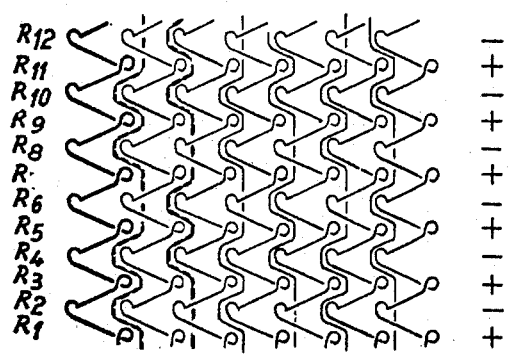
FIG. 13 is a schematic view of the pattern of a three-guide bar, single-needle bar stitch-bonded fabric.
Figure 14:
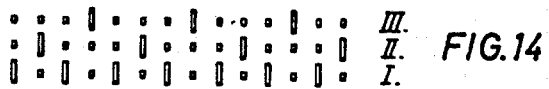
FIG. 14 is a diagrammatic view of the thread filling of the guide bars to produce the pattern of FIG. 13.
Figure 15:
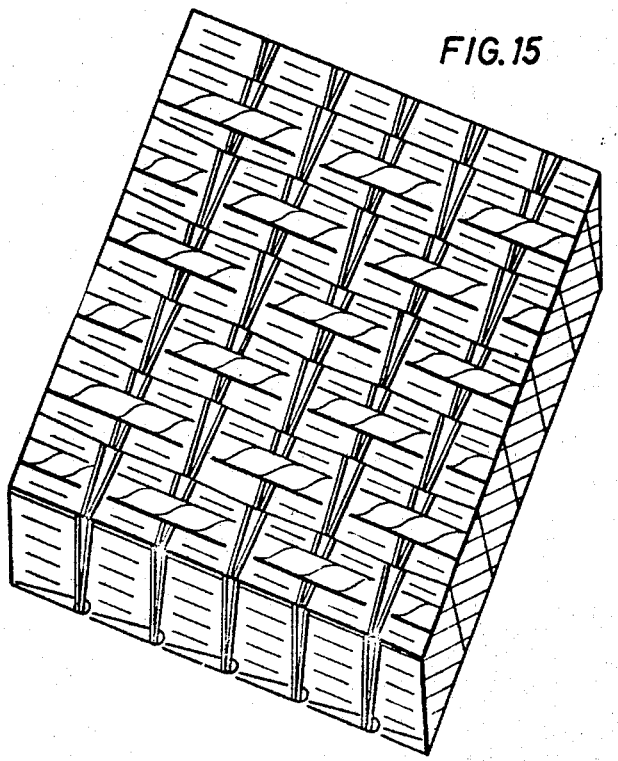
FIG. 15 is a perspective view of the interlacing structure produced by the thread filling and pattern according to FIGS. 13 and 14 on the primary layer, for example, on a fibrous fleece or nonwoven fabric.

FIG. 15 shows a stitch bonded fabric, for the production of which the thread filling of FIG. 14 has been employed. The first guide bar I is pattern-threaded one in, one out and forms from the warp threads the cloth interlacing structure of the ground web wherein tuck laps 2 alternate with stitches 3'''' of the ground web structure. The pattern of a warp thread 1'''' is represented in FIG. 13 by a relatively darker line.

The second and third guide bars 2'''' and 3'''' insert unstitched standing threads 4'''' in the longitudinal direction of the stitch-bonded fabric as shown by the dotted line in FIG. 13, the standing threads 4'''' crossing with the threads of the ground web structure.

The lapping formulas for the various embodiments represented in FIGS. 1, 4, 7, 10 and 13 are as follows:

FIG. 1

Guide Bar No. 3:
4–3/0–0/4–3/0–0 and repeat
Guide Bar No. 2:
3–3/1–1/0–0/2–2 and repeat
Guide Bar No. 1:
5–4/3–2/0–1/2–3 and repeat

FIG. 4

Guide Bar No. 3:
0–0, 2–3/4–4, 4–4/4–4, 2–1/0–0, 0–0 and repeat
Guide Bar No. 2:
3–3, 1–1/1–1, 0–0/0–0, 1–1/1–1, 3–3 and repeat
Guide Bar No. 1:
5–4, 3–3/3–2, 0–0/0–1, 2–2/2–3, 5–5 and repeat

FIG. 7

Guide Bar No. 3:
1–1/3–3/1–1/1–1/1–1/3–3/1–1/3–3/1–1/1–1/1–1/ and repeat
Guide Bar No. 2:
2–2/5–4/2–2/5–4/2–2/5–4/0–0/3–2/0–0/3–2/0–0/ and repeat
Guide Bar No. 1:
1–0/1–1/1–0/1–1/1–0/1–1/1–0/1–1/1–0/1–1/1–0/ and repeat

FIG. 10

Guide Bar No. 4:
1–1/3–3/1–1/1–1/1–1/1–1/3–3/1–1/1–1/1–1/1–1/ 1–1/ and repeat
Guide Bar No. 3:
0–0/0–0/0–0/2–2/0–0/0–0/0–0/0–0/2–2/0–0/0–0/ 2–2/ and repeat
Guide Bar No. 2:
1–0/3–2/1–0/3–2/5–2/1–0/3–2/1–0/3–2/1–0/3–0/ 3–2/ and repeat
Guide Bar No. 1:
3–2/5–4/3–2/5–4/2–5/3–2/5–4/3–2/5–4/2–3/0–3/ 5–4/ and repeat

FIG. 13

Guide Bar No. 3:
2–2/2–2/2–2/3–3/2–2/3–3 and repeat
Guide Bar No. 2:
4–4/5–5/4–4/5–5/4–4/4–4 and repeat
Guide Bar No. 1:
1–0/3–2/1–0/3–2/1–0/3–2 and repeat The foregoing method of our invention permits the production of knitted and sewn fabrics in a rich selection of new pattern interlacing structures which can be attained and even further varied by combination with plastic patterns, and the like and, if desired, also with plush loops. The warp knitted and stitch-bonded fabrics produced in accordance with the method of our invention possess very good characteristics with respect to stability and appearance which have heretofore only been obtainable with woven fabrics, the rate of production however being markedly greater by our inventive method than by employing the heretofore known weaving methods.

We claim:

1. Method of producing a warp knitted or stitch bonded fabric with two-part knitting needles having a hook portion including a hook and a shank, and a tongue slidable along the shank for closing the hook, and at least two guide bars including at least one front guide bar, which comprises the steps of laying-in threads of at least one warp thread system into the hooks of at least some of the needles in an uppermost position thereof by the one front guide bar in at least one dead center of a reciprocating movement of the one front guide bar;

downwardly displacing the needles with the hooks remaining open so that old loops of a ground web structure slide from the needle shanks into the open hooks, the old loops not being knocked over, the threads laid in the hooks forming tuck laps;

upwardly displacing the needles so that the old loops, that are not knocked over, slide down onto the needle shanks together with the tuck laps;

laying-in new threads into the hooks of the needles in uppermost position thereof;

downwardly displacing the needles with the hooks closed by the tongues so that the old loops together with the tuck laps slide from the needle shanks and are knocked over the needle heads while the new threads in the hooks form new loops of the ground web structure; and during the foregoing steps, laying-in unintermeshed standing threads under the needles by at least one additional back guide bar, which has a reciprocating movement, in at least some courses, corresponding to that of the one front guide bar so that the additional back guide bar, in said courses and in the dead centers of said guide bars, lays said unintermeshed standing threads over tuck laps onto the underside of the web whereby the unintermeshed standing threads become interlaced at least with the tuck laps.

2. Method according to claim 1, which includes, with the other guide bar that produces the tuck lap, when forming other courses, placing threads under at least one needle so that the latter threads form underlaps.

3. Method according to claim 1, which includes, with the other guide bar that produces the tuck lap, when forming other courses, placing threads in the needle hook portions that are closed by the respective movable portions of the needles as the latter are downwardly displaceable to knocking-over position thereof, so that stitches of the ground web structure are formed.

4. Method according to claim 1, which includes forming loops in each second course with a further guide bar of a further warp thread system with the aid of the knitting needles of a second needle bar.

5. Method according to claim 1, which includes forming stitches of a pattern in each course with a further guide bar of a further warp thread system with the aid of the knitting needles of a second needle bar.

6. Method according to claim 2, which includes forming on a needle bar, with a guide bar cooperating with the knitting needles, tuck laps in specific courses and underlaps of the ground web structure in other courses, from the threads of a warp thread system inserted patternwise into the last-mentioned guide bar, while forming with a second guide bar, on the non-stitch forming knitting needles of the same needle bar, loops in several courses and underlaps in the remaining courses from the threads of a further warp thread system inserted patternwise into said second guide bar.

7. Method according to claim 3, which includes forming on a needle bar, with a guide bar cooperating with the knitting needles, tuck laps in specific courses and stitches of the ground web structure in other courses, from the threads of a warp thread system inserted patternwise into the last-mentioned guide bar, while forming with a second guide bar, on the non-stitch forming knitting needles of the same needle bar, loops in several courses and underlaps in the remaining course from the threads of a further warp thread system inserted patternwise into said second guide bar.

8. Method according to claim 6, which includes inserting the thread of one of the warp thread systems always between threads of the other warp thread system with two guide bars having the same though mutually offset pattern thread filling, and forming in cooperation with the knitting needles, tuck laps in specific courses and underlaps in the other courses, the two guide bars inserting the threads in selected courses into the needle hooks of pairs of adjacent knitting needles, and the pattern of both warp thread systems in these selected courses being selectively in the same and opposite directions.

9. Method according to claim 7, which includes inserting the thread of one of the warp thread systems always between threads of the other warp thread system with two guide bars having the same though mutually offset pattern threading, and forming in cooperation with the knitting needles, tuck laps in specific courses and stitches of the ground web structure in the other courses, the two guide bars inserting the threads in selected courses into the needle hooks of pairs of adjacent knitting needles, and the pattern of both warp thread systems in these selected courses being selectively in the same and opposite directions.

10. Method according to claim 3, which includes placing each unstitched standing thread alternately above and below at least one thread of the ground web structure.

11. Method according to claim 2, which includes placing each unstitched standing thread alternately above and below an underlap.

References Cited
UNITED STATES PATENTS

| | | | |
|---|---|---|---|
| 1,993,766 | 3/1935 | Welch et al. | 66—195 |
| 3,520,155 | 7/1970 | Koppenburg | 66—190 |

OTHER REFERENCES

Wheatley, CO–WE–NIT, The Knitted Outerwear Times, Sept. 16, 1968, pp. 61 to 67.

RONALD FELDBAUM, Primary Examiner